United States Patent [19]

Periou

[11] Patent Number: 5,103,691
[45] Date of Patent: Apr. 14, 1992

[54] DEVICE FOR THE MOTORIZED CONTROL OF A SET OF ELEMENTS SUCH AS THE ADJUSTABLE PARTS OF A VEHICLE SEAT

[75] Inventor: Pierre Periou, Cergy Pontoise, France

[73] Assignee: Rockwell Automotive Body Systems, France

[21] Appl. No.: 672,267

[22] Filed: Mar. 20, 1991

[30] Foreign Application Priority Data

Mar. 27, 1990 [FR] France .................................. 90 03909

[51] Int. Cl.⁵ ............................................. F16H 37/06
[52] U.S. Cl. .............................. 74/665 GD; 74/665 L
[58] Field of Search ......... 74/665 G, 665 GD, 665 L, 74/665 Q, 665 P, 89.14; 297/339, 362

[56] References Cited

U.S. PATENT DOCUMENTS 4,366,983  1/1983  Klueting et al. ................... 297/362
4,962,963  10/1990  Robinson .......................... 297/362 X

FOREIGN PATENT DOCUMENTS 2136086  9/1984  United Kingdom .............. 297/362

Primary Examiner—Dwight Diehl

[57] ABSTRACT

This device comprises a motor (1), the output shaft (2) of which carries two coaxial worms (5, 6), offset axially and with opposite pitches, two pairs of wheels, (7, 9, 8, 11) meshing with the worms, mutually in pairs, at the rate of two wheels (7, 8; 9, 11) per worm, which wheels are arranged on either side of the worms, an output shaft (12, 13, 14, 15) traversing each wheel (7, 8; 9, 11) freely and intended to control an associated element at one or other of its opposite ends, and on each shaft (12 ... 15) and facing each wheel (7 ... 11), a clutch (E1, E2, E3, E4) independent of the other clutches and adapted in order to be able to link the selected shaft in rotation to the corresponding wheel. This arrangement makes it possible to produce a compact control assembly distributing, from a single location, multiple functions from a lightweight divider box ensuring the switching of the functions, with a reduced overall size and a simplified single connection.

13 Claims, 7 Drawing Sheets

FIG_2

FIG_4

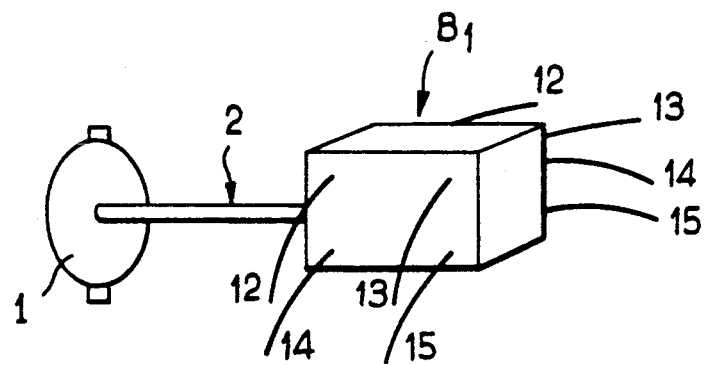
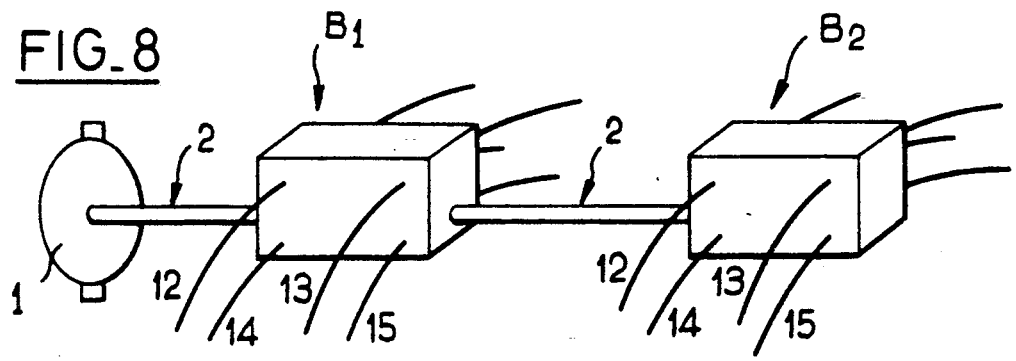
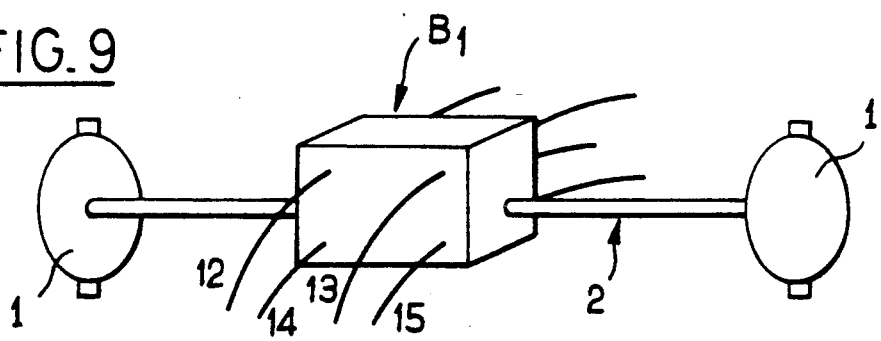
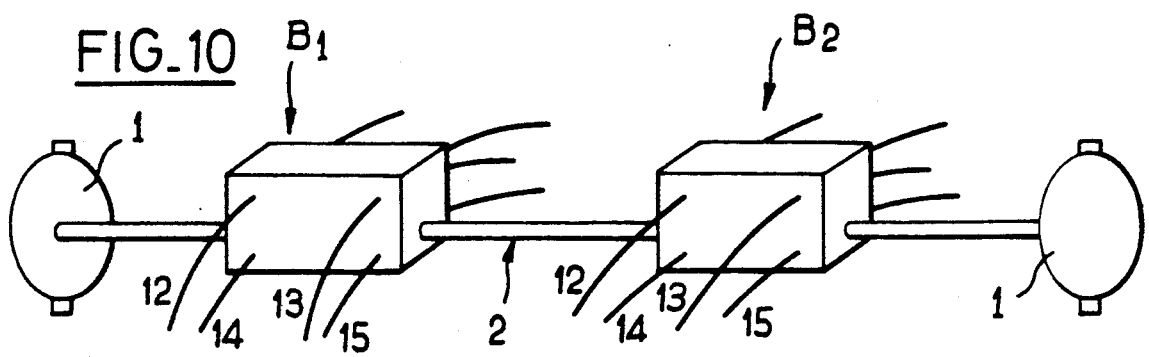

DEVICE FOR THE MOTORIZED CONTROL OF A SET OF ELEMENTS SUCH AS THE ADJUSTABLE PARTS OF A VEHICLE SEAT

The subject of the present is a device for the motorised control of a set of elements such as adjustable parts of a vehicle seat: longitudinal adjustment of the cushion of the seat, front raising and rear raising, hinging of the squab, vertical and backward adjustment of the headrest, etc.

For such applications in a vehicle, motors have been used which are provided with multiple reduction gears supplying, as output, three or four power take-off shafts which control, by means of the clutch, the functions required. These high-torque and low-speed outputs required between the motor and the user a link by means of a rigid and heavy rotating shaft.

The mounting beneath a seat made it possible to control only the functions then required: longitudinal adjustment of the seat on the rails, front raising, rear raising and sometimes inclination of the squab.

The transmission of the movement with this type of low-speed and high-force device requires heavy, expensive and bulky means. These solutions have been made uncompetitive by the reduction of the cost of the motors, which has led to the use of one motor per function. Moreover, the growth in consumer demand towards increasingly more comfortable seats tends to increase the number of the motorised functions. Thus, currently, in addition to the conventional functions of longitudinal adjustment on rails, front raising and rear raising of the cushion, and inclination of the squab, new functions are often required: double adjustment of the headrest forwards and backwards, and vertically, back adjustment (lumbar support), movable support for the thighs of the driver at the front of the cushion, and adjustable cushion side pieces. Furthermore, the memorising of the positions for each function is often required.

The solution currently employed consists in using one motor per function. It therefore results in systems which are expensive, bulky and consequently difficult to accommodate in the restricted spaces of a vehicle. Access to these systems is difficult and they entail a multiplicity of connections for each of the motors and for each of the memorised functions.

The object of the invention is therefore to provide a motorised-control device which does not have these disadvantages.

According to the invention, the device for the motorised control of a set of elements such as the adjustable parts of a vehicle seat comprises:

at least one motor equipped with an output shaft carrying two coaxial worms, offset axially on the output shaft and with opposite pitches, these worms forming the input of the device, pairs of wheels meshing with the worms, mutually in pairs, an output shaft traversing each wheel freely and intended to control an associated element at one or other of its opposite ends, on each shaft and facing each wheel, a clutch independent of the other clutches and adapted in order to be able to link the selected shaft in rotation to the corresponding wheel; the wheels, shafts and associated clutches together form a function divider.

The device thus constructed forms a compact assembly capable of distributing, from a lightweight divider box, multiple functions and ensuring the switching of the functions, the memorisation of the position of each of them, and a simplified single connection.

Various known means exist for driving four output shafts from a single input: belts, worms, gears, etc.

The worm drive is the best suited for reasons of overall size but it generates axial forces on the worm. In order to prevent these forces, a double worm with opposite pitches is used.

This dispenses with the axial supports required in the case of a single worm, as well as the corresponding wastage and wear.

According to other features of the invention:

each clutch comprises a sleeve coaxial with the shaft, integral in rotation with the latter and mounted so as to slide axially between the associated wheel and a stop fixed to the shaft, and an elastic member constantly stressing the sleeve to slide axially from a position disconnected from the wheel towards a position engaged with the wheel, this clutch furthermore being equipped with a means for retaining the sleeve in its disengaged position, such as an axially movable fork, the sleeve is linked in rotation to the shaft by a system of complementary axial splines arranged on the shaft and in the sleeve, the wheel is equipped with a claw for engaging the sleeve on the wheel.

Other features and advantages of the invention will become apparent in the course of the following description made with reference to the attached drawings which illustrate several embodiments of the invention by way of non-limiting examples.

The device shown in FIG. 1 is intended for the motorised control of a set of elements, not shown, such as the various adjustable parts of a vehicle seat (longitudinal adjustment, front and rear raising, hinging of the squab, etc.).

It comprises the following members:

an electric motor 1 equipped with an output shaft 2 consisting of a flexible rotating cable 3 connected to the output proper of the motor 1, and of a rigid shaft 4; the latter, fixed to the cable 3, carries two coaxial worms 5 and 6, offset axially on this shaft 4 and having screw threads 5a, 6a with opposite pitches, these worms 5, 6 forming the input of the device, two pairs of wheels 7, 8 and 9, 11, each equipped with a screw thread 7a, 8a, 9a, 11a capable of meshing with the corresponding screw threads of the worms 5, 6, these wheels being, for this purpose, arranged on either side of the worms 5, 6 at the rate of one pair on each side, a shaft 12, 13, 14, 15 traversing freely a respective wheel 7, 8, 9 and 11, these shafts being intended to control an associated element, not shown, at one or other of its opposite ends, on each shaft 12, 13, 14, 15 and facing each corresponding wheel 7, 8, 9, 11, a clutch E1, E2, E3, E4 (the clutch E2 not being visible); each clutch is independent of the other clutches and adapted in order to be able to link the selected shaft (12 or 13 or 14 or 15) in rotation to the corresponding wheel; the wheels, shafts and associated clutches together form a function divider.

In the example described, two threaded wheels 7, 8 mesh with the worm 5 with respect to which they are diametrically opposite, and the same applies to the threaded wheels 9, 11 with respect to the worm 6. The two wheels situated on the same side of the worms 5, 6 mesh with each other: the wheels 7 and 9 therefore engage with each other and rotate in opposite directions (arrows R1 and R2, FIG. 1) when the shaft 2 rotates in a given direction.

Each output shaft 12, 13, 14, 15 is formed, in a manner known per se, of a rotating flexible cable accommodated in a cylindrical sheathing.

A clutch (E1 or E2, . . . ) will now be described with reference to FIGS. 2 and 3.

A clutch comprises a sleeve 16 coaxial with the respective support shaft (12, 13, 14, 15), integral in rotation with the latter and mounted so as to slide axially on this shaft between the associated wheel 7 (9, 8, 11) and a stop 17 fixed to the shaft 12 (14, . . . ). Each clutch E1, E2, . . . is also equipped with an elastic member 18 constantly stressing the sleeve 16 to slide axially from a position in which it is disconnected or disengaged from the associated wheel such as 7 (position of the sleeve 16 of the clutch E1 in FIG. 3) towards a position engaged with the wheel, as can be seen for the clutch E3 (FIG. 3). In the example described, the elastic member for returning the sleeve 16 to its position engaged with the wheel is a helical spring surrounding the support shaft (12, 14 . . . ) and compressed between the stop 17, consisting of an annular shoulder fixed to the shaft 12, 14, and an annular bearing piece 19 projecting radially from the sleeve 16. In each clutch, the latter is linked in rotation to the support shaft 12, 14, . . . for example as shown by a system of complementary axial splines 21, 22 respectively arranged on the shaft 12, 14, . . . and in the sleeve 16.

Each wheel such as 7, 9 is equipped, on the side of the sleeve 16, with a claw 23 over which can be fitted the sleeve 16 in the position engaged on the wheel 7, 9, . . . (position of the clutch E3 in FIG. 3). Each clutch E1, E2, . . . is, furthermore, equipped with a means for retaining the sleeve 16 in its disengaged position, for example, as known per se, a fork 24 which is axially displaceable and profiled in order to fit over the radial shoulder 19 of the sleeve 16.

A clutch E1, E2, . . . functions as follows.

a) In the disengaged position, as shown for the clutch E1 (FIG. 3), the fork 24 compresses the spring 18 and holds the sleeve 16 disengaged from the claw 23, at a certain distance from the wheel 7, the sleeve 16 abutting the shoulder 17 axially. In this state of the clutch E1, the rotation of the worm 5 drives the wheel 7 but not the shaft 12 traversing said wheel, this shaft therefore remaining stationary, as do the sleeve 16 and the spring 18.

b) In the engaged position (clutch E3 in FIG. 3), the fork 24 has been displaced axially as far as the level of the claw 23 and therefore frees the sleeve 16. The latter, pushed by the spring 18, slides on the shaft 14 and its nose, adapted to the claw 23, fits over the latter. Consequently, the sleeve 16 and the shaft 14 with which it is integral in rotation are then linked in rotation with the wheel 9, itself driven in rotation by the worm 6.

The forces of the spring 18 are within this assembly, no friction being generated between the various parts.

Each fork 24 can, of course, be controlled independently of the others, with the result that each clutch is thus independent of the three others and can be controlled, as desired, from the input shaft 2 driven in rotation in one or other direction by the motor 1.

Each output shaft 12, 13, . . . can be used in order to control the associated element either at just one of its ends or at both ends, in a manner known per se.

As already mentioned, the arrangement of the two worms 5, 6, axially offset and with opposite pitches on the same shaft 4, generates axial forces which are absorbed by the worms and are consequently cancelled out. Dispensing with the conventional bearings for absorbing the axial forces, in addition to the advantages already mentioned, achieves a saving in the efficiency of the device and reduces its weight and its overall size.

When a clutch is in the engaged position (E3, FIG. 3), the forces are developed only between parts which rotate together. Moreover, the two wheels 7 and 9, on the one hand, and 8 and 11, on the other hand, mesh together, so that each wheel is driven by forces distributed between the worm 5 (6) and the wheel 7 (9) and between the two wheels 7, 9 or 8, 11. This makes it possible to reduce the dimensions of the toothings of the wheels and of the worms, and hence the overall size of the divider.

The assembly consisting of the four clutches E1, E2, E3, E4 is accommodated in a casing 20 in which are arranged passage orifices for the flexible shafts 12, 13, 14 and 15. The latter can be used as double outputs, at their two opposite ends, in order to fulfil a two-location function, for example the control of the rails of the seat of a vehicle.

Another advantage of the device according to the invention lies in the fact that it permits a centralisation of the sensors for memorising the positions of the controlled elements, for each user by memorising, in accordance with a known method, the number of revolutions of each shaft corresponding to a setting selected by a user (for example adjustment of the inclination of the squab, adjustment of the position of the seat on the rails, etc.). Indeed, hitherto a motor was required for each function with wires which locate the memorisation function on each element taken separately.

In the embodiment shown in FIG. 4, the device comprises, in addition to the four clutches E1-E4 described above, a potentiometric system interacting with each shaft 12, . . . 15. Each output shaft is thus connected to a reduction gear 25 controlling a potentiometer 26 which can deliver an information item indicating the position of the corresponding element (not shown). The shaft 25a of each reduction gear 25 is arranged coaxially with two circular electric tracks 27, 28 of the potentiometer 26, and carries a slide contact 29 with two tabs in sliding contact with the tracks 27 and 28. The outer track 27 is connected at its opposite ends to the plus and minus terminals of the direct-current source. All the plus terminals of the tracks 27 are connected by a single wire, and all the minus terminals are connected by another single wire (these two wires not being shown in FIG. 4 so as not to clutter the drawing). Under these conditions, by virtue of this arrangement, a substantial reduction is obtained in the number of the connections necessary as compared with a conventional system, requiring the various potentiometers to be spread throughout the vehicle. Indeed, in such a prior system, three connection wires are required per potentiometer, in other words twelve in total for four potentiometers, whereas in the system according to the invention a total of six wires suffices (one wire per potentiometer and two connecting wires joining the plus and minus terminals).

In the embodiment shown in FIG. 5, the control device differs from that in FIG. 4 in that the potentiometers 26 and their reduction gears 25 are replaced for each shaft by a pulse distributor 31. These pulse distributors can consist, for example, of a toothed wheel 32 fixed to the corresponding shaft 12, 13, 14, 15, and of a member 33 for counting the pulses generated by the rotation of the shaft and of its toothed wheel 32. These counting members 33 are of a type known per se, for example comprising a photoelectric cell, and do not need to be described. Each distributor 31 therefore makes it possible to identify separately the position of each element controlled by the corresponding shaft.

In the other embodiment illustrated in FIG. 6, the four pulse distributors 31 are replaced by a single distributor 34, of the same type, arranged on the input shaft 2, and more precisely on the smooth part 4a of the rigid shaft 4 carrying the worms 5 and 6. This distributor 34 makes it possible, together with the control of the function switching means (not shown), to identify separately the position of each function.

FIGS. 7 to 10 show various possible embodiments of assemblies incorporating control devices according to the invention.

FIG. 7 shows diagrammatically an assembly comprising a motor 1 interacting with a divider box B1 similar to that shown in FIGS. 1 to 6 and which therefore has four output shafts 12, 13, 14, 15, corresponding to four functions.

Figure 1:
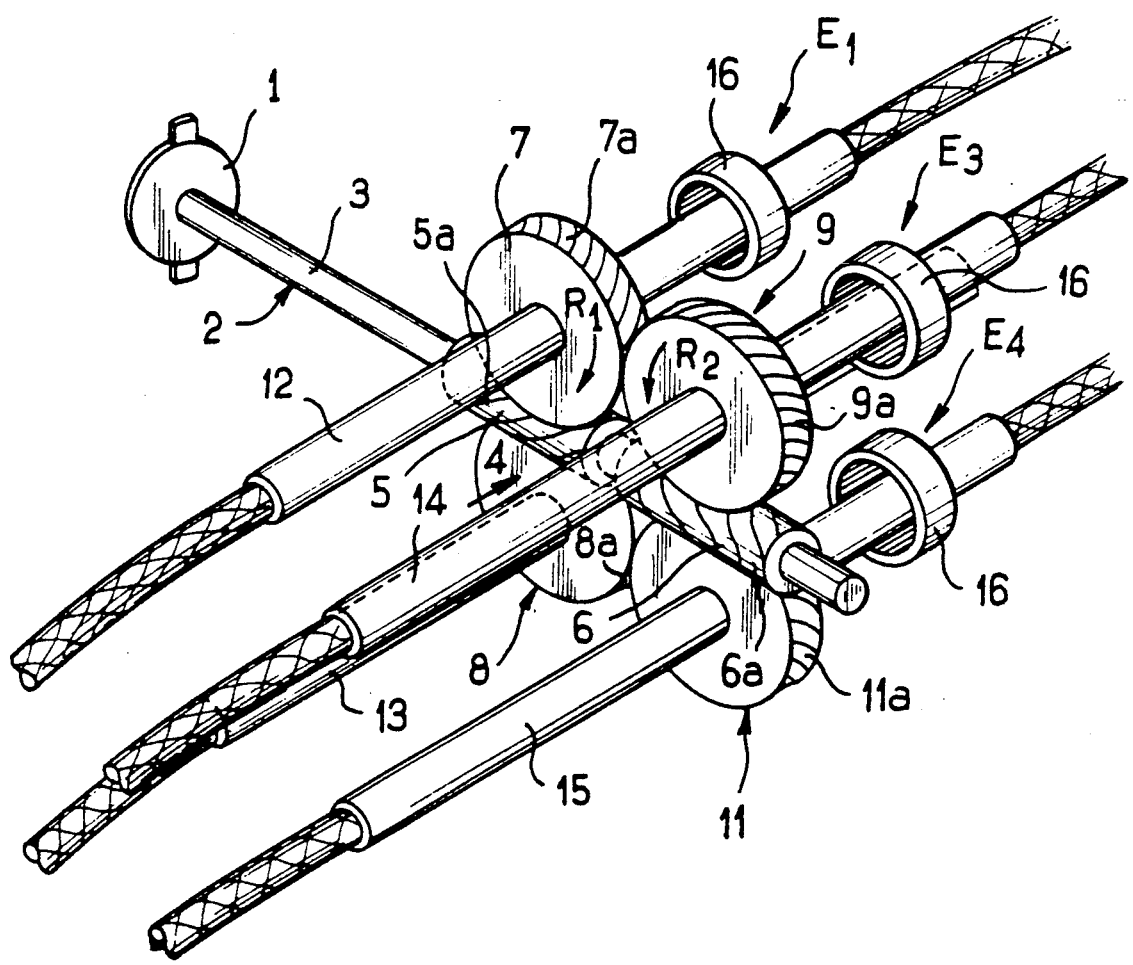
Figure 2:
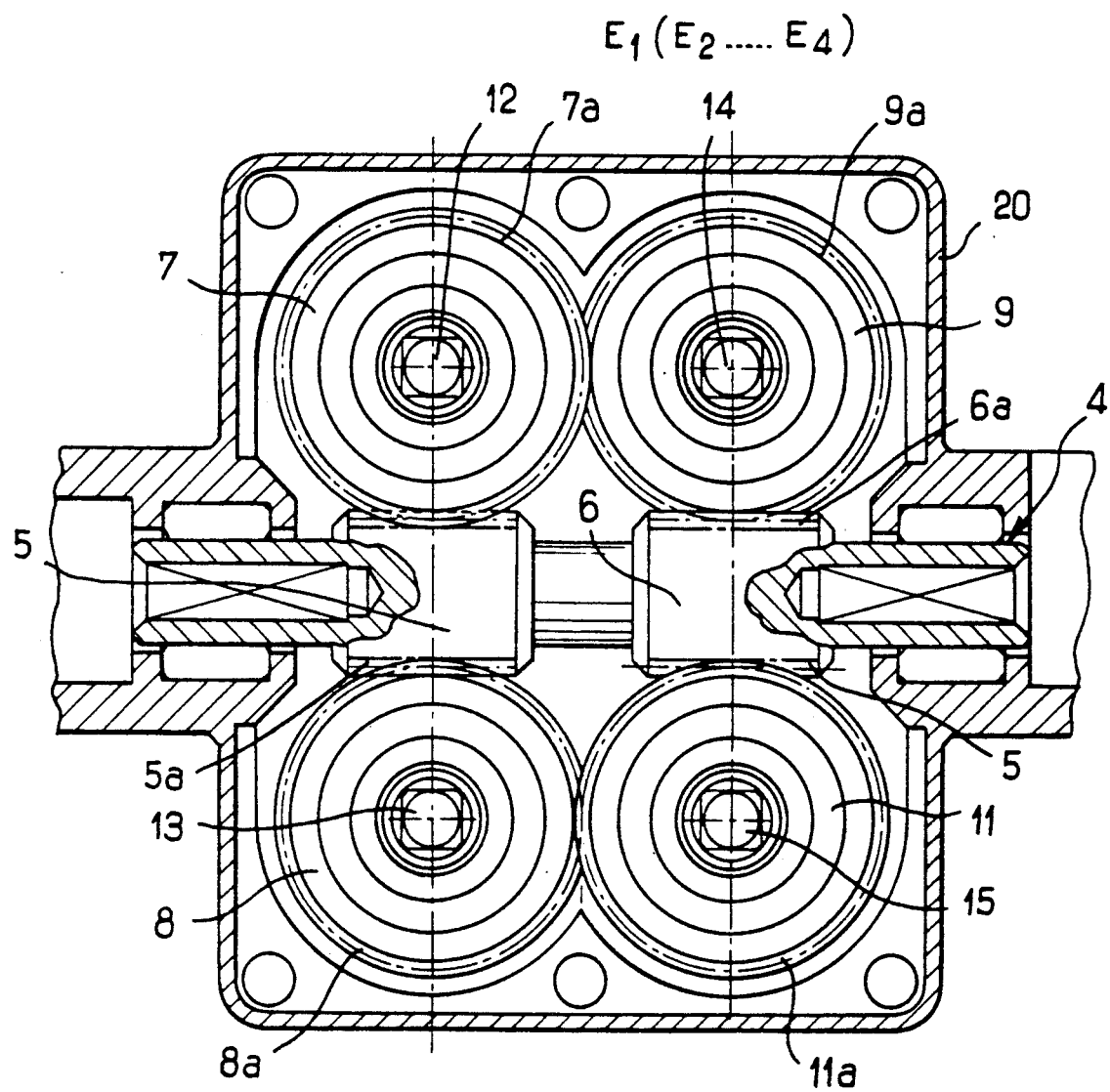
Figure 3:
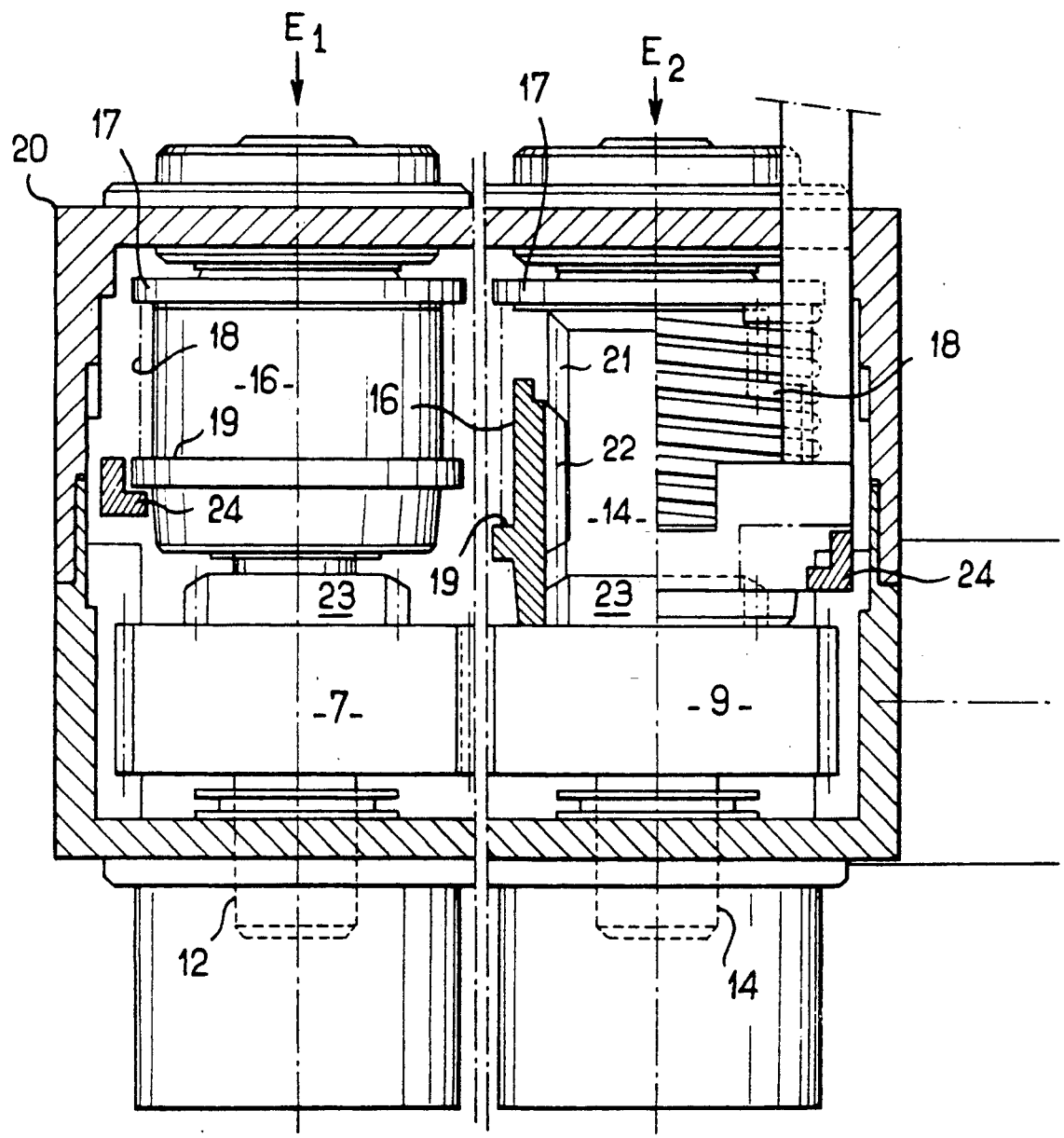
Figure 4:
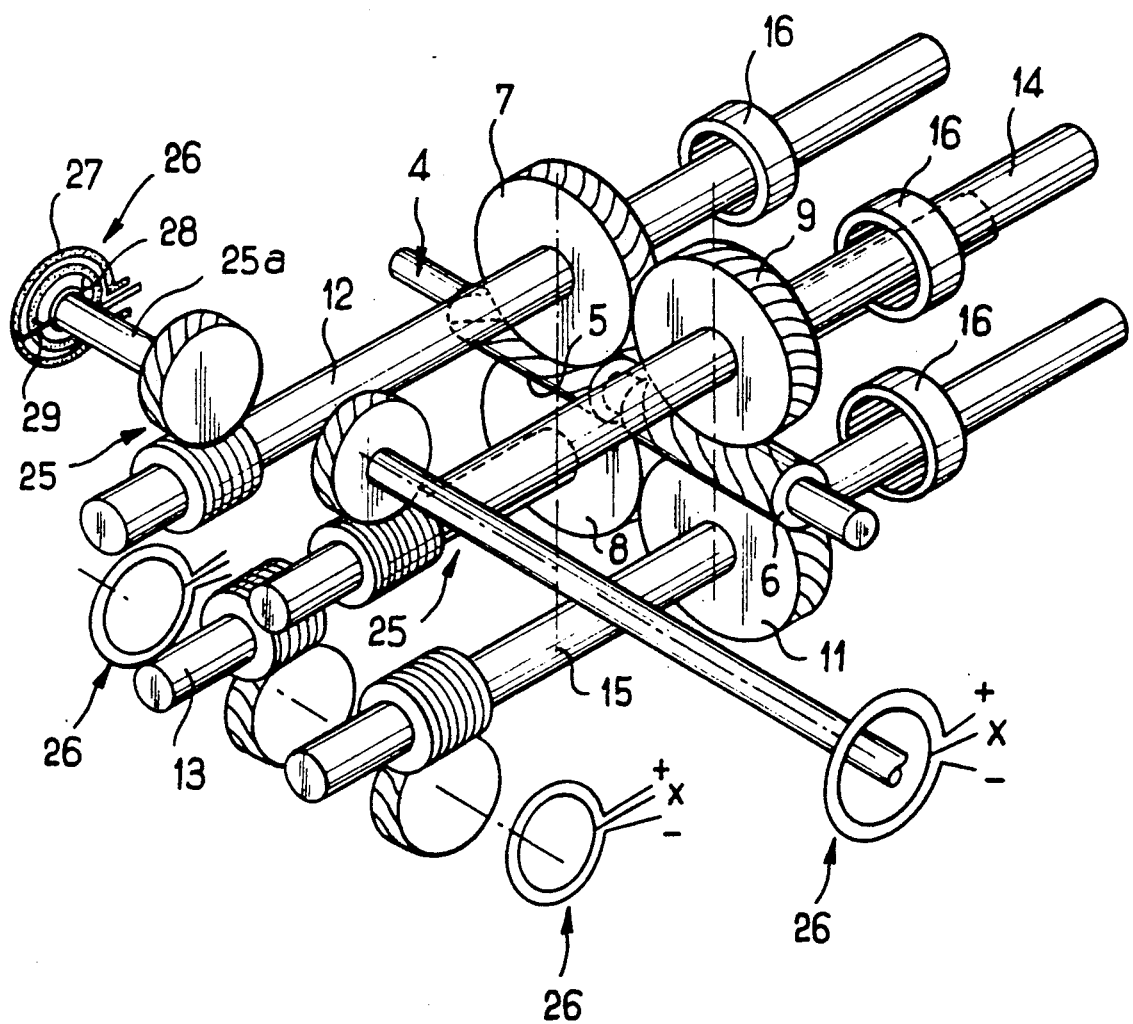
Figure 5:
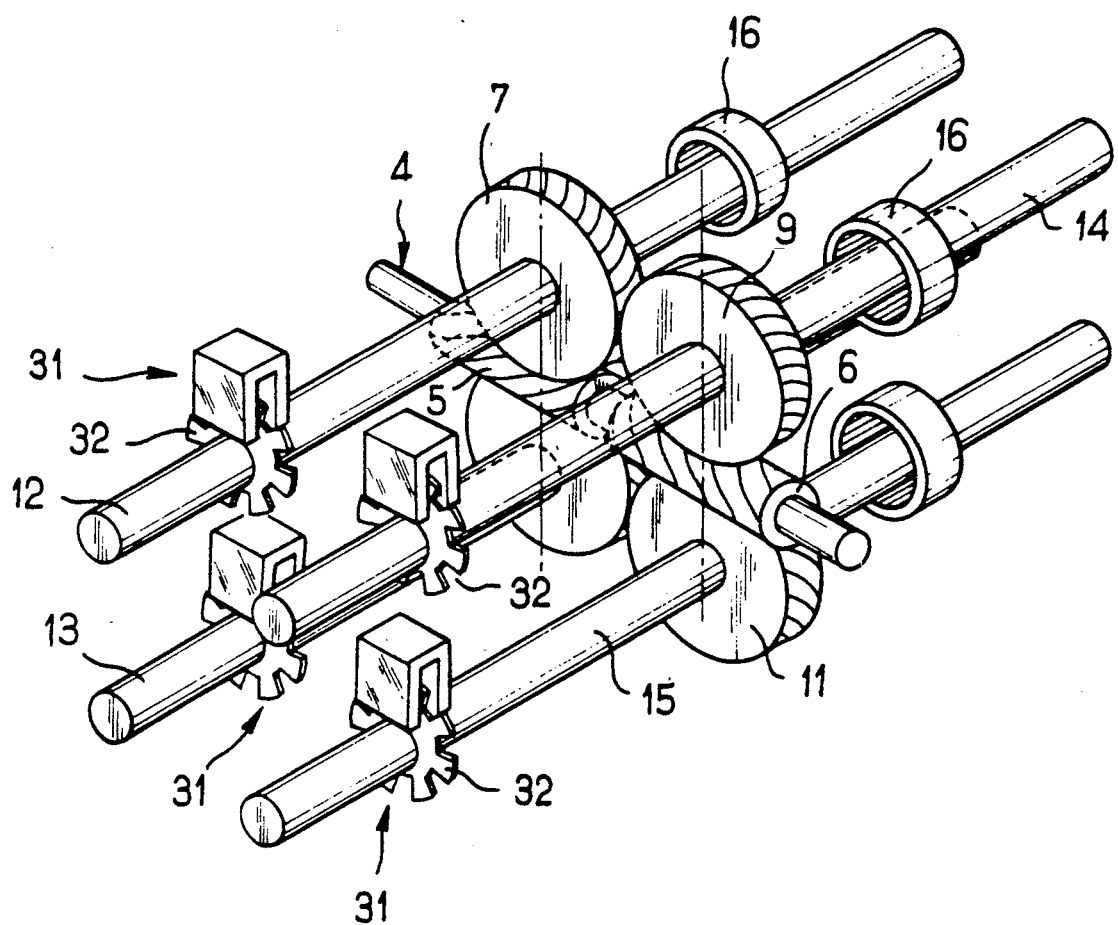
Figure 6:
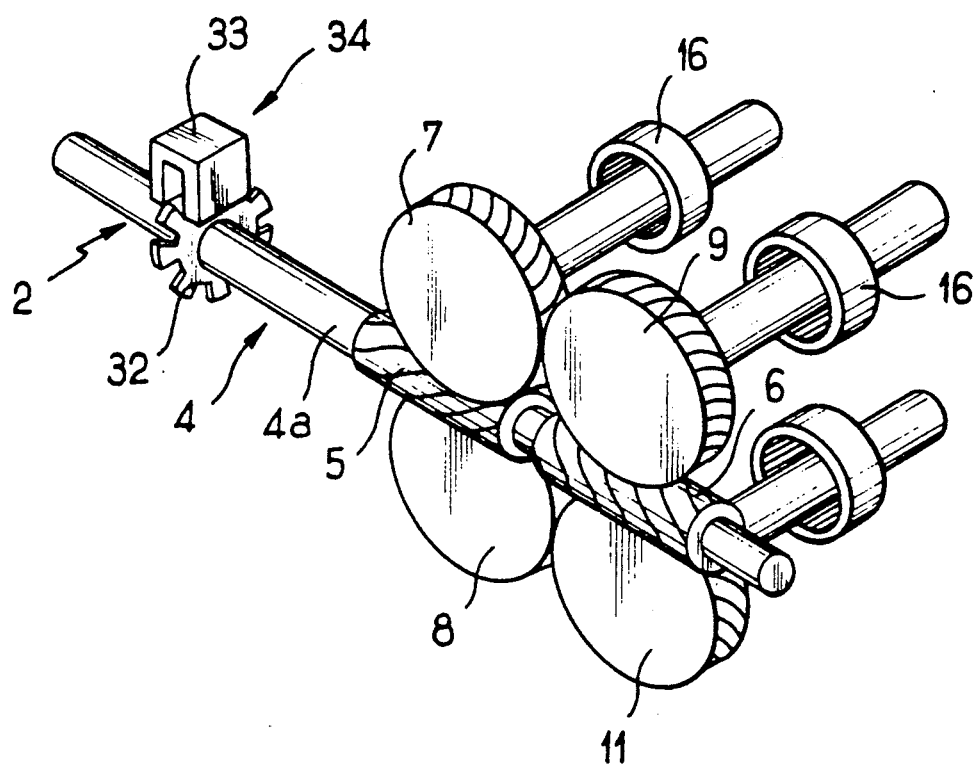

FIG. 8 shows an assembly comprising a motor 1 and two function-divider boxes B1 and B2, an input shaft 2 driven by the motor 1, traversing the two dividers B1, B2 and carrying two pairs of worms 5, 6, each interacting with a divider B1 and B2 (the divider box B2 being similar to the box B1). This assembly therefore has eight functions, any one of which can be obtained. Several functions can, moreover, be obtained simultaneously if the direction of rotation required for each function is compatible with the directions of rotation of the other functions.

The assemblies of FIGS. 9 and 10 each comprise two motors. The assembly of FIG. 9 has two motors 1 having a common output shaft 2 carrying a pair of worms 5, 6 which interacts with a divider box B1. The two motors 1 can be connected in series or in parallel and make it possible to have available four speed/torque characteristics. One of the two motors can be supplied under total voltage, whereas the other is disconnected. Other characteristics can be obtained if the motor not used serves as a brake, for example for a seat headrest.

In the embodiment of FIG. 10, the assembly comprises two function dividers B1 and B2 connected by the same shaft 2 carrying two pairs of worms 5, 6, each interacting with one divider B1 and B2, and two motors 1 are linked to the opposite ends of the common shaft 2.

According to other possible alternatives, two separate systems can be used, each consisting of a motor and of a four-function divider box. This alternative corresponds to a duplication of the device of FIG. 7 and makes it possible to request simultaneously two functions irrespective of their directions. It is also possible to effect a duplication of the system of FIG. 9 with independence of the two assemblies and selection of the speed/torque characteristic.

I claim:

1. Device for the motorized control of a set of elements such as adjustable parts of a vehicle seat, characterised in that it comprises:
    at least one motor (1) equipped with an output shaft (2) carrying two coaxial worms (5, 6), offset axially on the output shaft and with opposite pitches, these worms forming the input of the device,
    pairs of wheels (7, 9, 8, 11) meshing with the worms, mutually in pairs,
    an output shaft (12, 13, 14, 15) traversing each wheel (7, 8; 9, 11) freely and intended to control an associated element at one and/or the other of its opposite ends,
    on each shaft (12 . . . 15) and facing each wheel (7 . . . 11), a clutch (E1, E2, E3, E4) independent of the other clutches and adapted in order to be able to link the selected shaft in rotation to the corresponding wheel; the wheels, shafts and associated clutches together form a function divider.

2. Device according to claim 1, characterised in that each clutch (E1 . . . E4) comprises a sleeve (16) coaxial with the shaft (12, 13, 14, 15), integral in rotation with the latter and mounted so as to slide axially between the associated wheel (7 . . . 11) and a stop (17) fixed to the shaft, and an elastic member (18) constantly stressing the sleeve to slide axially from a position disconnected from the wheel (7 . . . 11) towards a position engaged with the wheel, this clutch furthermore being equipped with a means (24) for retaining the sleeve in its disengaged position, such as an axially movable fork (24).

3. Device according to claim 2, characterised in that the sleeve (16) is linked in rotation to the shaft (12 . . . 15) by a system of complementary axial splines (21, 22) arranged on the shaft (12 . . . 15) and in the sleeve.

4. Device according to claim 2, characterised in that the wheel (7 . . . 11) is equipped with a claw (23) for engaging the sleeve (16) on the wheel.

5. Device according to one of claims 2 to 4, characterised in that the elastic member is a helical spring (18) surrounding the shaft (12 . . . ) and compressed between a shoulder (17) fixed to the shaft, and an annular bearing piece (19) of the sleeve, the shoulder (17) constituting the axial stop of the sleeve.

6. Device according to claim 2, characterised in that each output shaft (12 . . . ) is a flexible rotating cable capable of being connected at its opposite ends to each element to be controlled.

7. Device according to claim 1, characterised in that each output shaft (12 . . . 15) is connected to a reduction gear (25) for controlling a potentiometer (26) capable of delivering an information item indicating the position of the corresponding element.

8. Device according to claim 7, characterised in that all the potentiometers (26) have their plus and minus terminals respectively connected by a wire.

9. Device according to claim 1, characterised in that each output shaft (12 . . . 15) is equipped with a pulse distributor (31), for example a toothed wheel (32) fixed to the shaft and associated with a member (33) for counting the pulses.

10. Device according to claim 1, characterised in that the input shaft (2), consisting of the shaft of the drive motor (1), carries a pulse distributor (34), such as a toothed wheel (32) fixed to the shaft, associated with a member (33) for counting the pulses, and which makes it possible to identify separately the position of each controlled element.

11. Assembly comprising two function dividers (B1, B2), each in accordance with one of claims 1–4 or 6–10, an input shaft (2) driven by a motor (1) and carrying two pairs of worms (5, 6), each pair being associated with one function divider (FIG. 8).

12. Assembly comprising a function divider (B1) according to one of claims 1–4 or 6–10, and two motors (1) with a common output shaft (2) carrying a pair of worms (5, 6) interacting with the divider (B1) (FIG. 9).

13. Assembly comprising two dividers (B1, B2) according to one of claims 1–4 or 6–10, connected by the same shaft (2) carrying the two pairs of worms (5, 6) each pair interacting with one divider, and two motors (1) linked to the opposite ends of this common shaft (FIG. 10).

* * * * *